No. 865,859. PATENTED SEPT. 10, 1907.
P. BROPHY.
ORE CONCENTRATOR.
APPLICATION FILED MAY 23, 1907.
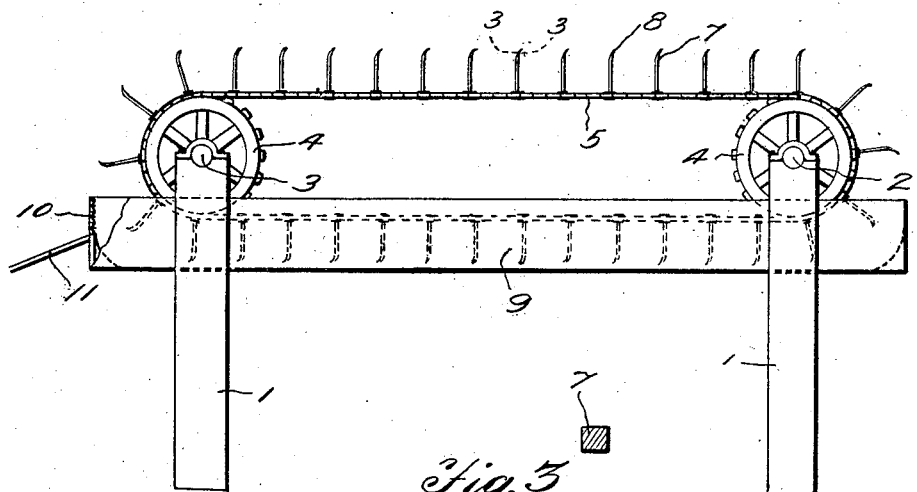
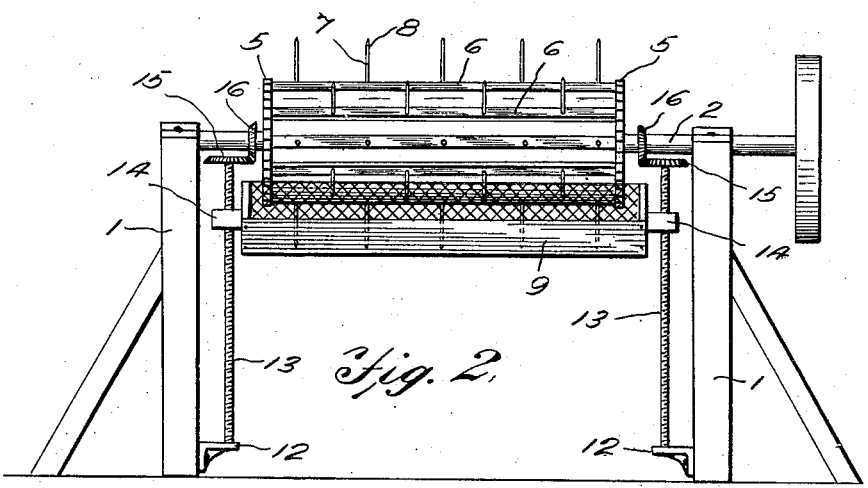
Inventor
Patrick Brophy
Witnesses
By Victor J. Evans
Attorney

UNITED STATES PATENT OFFICE.

PATRICK BROPHY, OF SOUTH OMAHA, NEBRASKA.

ORE-CONCENTRATOR.

No. 865,859.  Specification of Letters Patent.  Patented Sept. 10, 1907.

Application filed May 23, 1907. Serial No. 375,275.

*To all whom it may concern:*

Be it known that I, PATRICK BROPHY, a citizen of the United States of America, residing at South Omaha, in the county of Douglas and State of Nebraska, have invented new and useful Improvements in Ore-Concentrators, of which the following is a specification.

This invention relates to ore concentrators, and one of the principal objects of the same is to provide simple and efficient means for separating the gangue or worthless material from ores as it comes from the stamp mill, by simple and efficient means which will agitate the sludge so that the slime will rise to the top and pass off leaving the values behind.

Another object of the invention is to provide means for gradually lowering the sludge box and providing an endless apron with a series of fingers to agitate the sludge, the sludge box being lowered gradually so that the fingers will gradually rise to the upper portion of the sludge to keep the gangue or slime agitated so that it will readily pass off.

These and other objects may be attained by means of the construction illustrated in the accompanying drawing, in which:

Figure 1 is a side elevation of an ore concentrator made in accordance with my invention, a portion of the sludge box being broken away to better illustrate the construction. Fig. 2 is an end elevation of the same. Fig. 3 is a cross section of one of the fingers taken on the line 3—3 of Fig. 1 and enlarged.

Referring to the drawing for a more particular description of my invention, the numeral 1 designates the supporting legs and journaled in the upper ends of these legs are shafts 2—3. Fixed to these shafts are sprocket wheels 4 and passing around the sprocket wheels 4 are oppositely disposed drive chains 5. Connected to the drive chains 5 are a series of cross slats 6 to which are secured a series of fingers 7, said fingers being preferably rectangular in cross section as shown in Fig. 3 and provided with curved outer ends 8.

The sludge box 9 is provided with a screen 10 at one end near the upper edge of the box and an inclined chute 11 is secured to the box immediately under the screen. Connected to each of the legs 1 is a bracket 12 and mounted to rotate in each of said brackets is a threaded shaft 13, said shaft passing through a threaded follower block 14 connected to the sides of the box 9. On the upper ends of the threaded shafts 13 bevel gear wheels 15 are secured, said gear wheels meshing with similar gears 16 fixedly mounted on the shafts 2, 3.

The operation of my invention may be briefly referred to as follows: A quantity of sludge being placed in the box 9 and the shafts 2 3 slowly rotated by any suitable power, the fingers 7 move across from end to end of the sludge box and the lighter particles or the slime rise to the top and pass out through the screen 10. As the shafts 2 are rotated and the fingers 7 move from end to end of the sludge box the latter gradually lowers owing to the arrangement of threaded shafts 13 and the follower blocks 14. The result of this arrangement is that the fingers 7 gradually recede from the bottom of the box 9 toward the top of said box and thus do not agitate the concentrates which fall to the bottom of the box but merely agitate the slime toward the top until it passes off through the screen 10. This is deemed an important feature in my invention, since it does not keep the entire contents of the box in agitation but after the first settlement of the heavier particles to the bottom they are not again disturbed by the fingers, since the latter gradually rise relatively to the bottom of the box.

From the foregoing it will be understood that the pulp is constantly flowing from the stamps into the sludge box, and the light worthless material is constantly flowing away through the screen 10, while the heavier material or precious metal are gradually settling to the bottom of the box. The object of the screen is to retard the progress of any of the valuable particles that may be making a hurried movement to escape. When the sediment, concentrates, or values accumulate till they reach the base of the screen, the run is completed.

Having thus fully described the invention, what is claimed as new is:—

In an ore concentrator, the combination of a sludge box, an endless apron, shafts and sprocket wheels for moving said apron, bevel gears on said shafts, threaded shafts provided with intermeshing bevel gears, said shafts passing through follower blocks connected to said sludge box, said threaded shafts being adapted to automatically lower the sludge box as the concentrates accumulate.

In testimony whereof, I affix my signature in presence of two witnesses.

PATRICK BROPHY.

Witnesses:
ELLEN E. SOUTHWICK,
LEONARD A. DAVIS.